Figure 1:
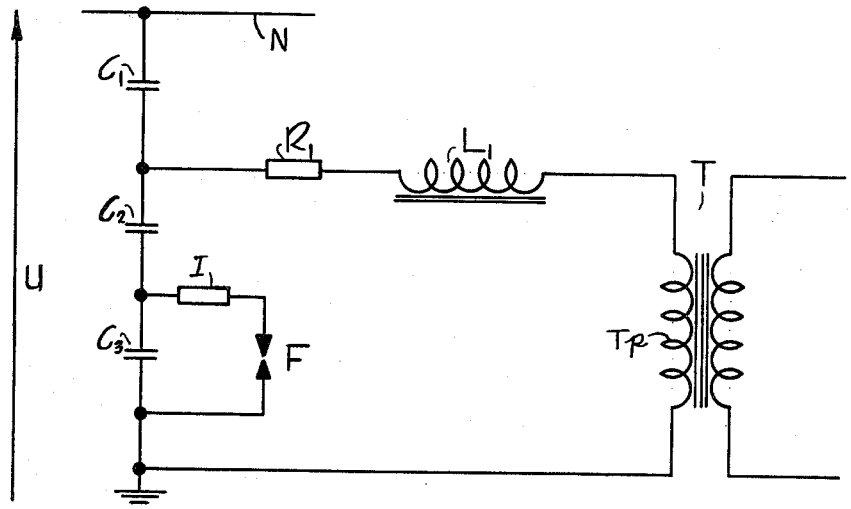

INVENTOR
Georges-Albert Gertsch

BY Pierce, Scheffler & Parker
ATTORNEYS

United States Patent Office 3,111,619
Patented Nov. 19, 1963

3,111,619
CIRCUIT ARRANGEMENT FOR AVOIDANCE OF OSCILLATIONS DUE TO IRON SATURATION OF CAPACITATIVE VOLTAGE TRANSFORMERS
Georges-Albert Gertsch, Zurich, Switzerland, assignor to Micafil A.-G., Zurich, Switzerland, a joint-stock company
Filed Jan. 13, 1961, Ser. No. 82,649
7 Claims. (Cl. 323—61)

This invention relates to potential transformers of the capacitative type comprising a capacitative voltage divider connected between a voltage source to be measured and ground, and an inductive middle potential circuit connected to the voltage divider, this circuit containing an iron core transformer and possibly also a choke coil connected in series with the primary of the transformer.

In a capacitative type potential transformer arrangement of the type referred to, two oscillating conditions at network frequency are known to be possible, one such condition being with small potentials at the middle potential circuit and lagging magnetization currents, and the other such oscillating condition being with large potentials and leading capacity currents. Which of these two oscillations sets in depends upon chance and is determined by the starting conditions of the circuit, particularly by the potential phase with which the current circuit is engaged. The second oscillating condition, which causes high over-voltages at the circuit elements makes the potential transformer unsuitable for operation and must definitely be avoided.

One arrangement which has been suggested for avoiding the second-mentioned oscillating condition is to connect an ohmic base load and/or a relatively high ohmic resistance in the current circuit. However, these two relatively simple measures are not without disadvantages since they result in a considerable loss in measuring accuracy of the potential transformer.

Another arrangement which has been suggested for avoiding the second-mentioned dangerous oscillating condition is to use the high over-voltages formed in it to connect a self-extinguishing spark gap in parallel with the potential transformer or with the condenser element of the voltage divider on the ground side. This spark gap then responds until, by chance, the favorable starting conditions of the circuit, in particular the favorable circuit moment, are attained, which leads to the first-mentioned, desirable oscillating condition of the circuit involving small potentials at the middle potential circuit and lagging magnetization currents.

It has also been suggested as an improvement for the above-mentioned arrangement employing a self-extinguishing spark gap to connect an impedance, especially a condenser element, in advance of the spark gap. This then eliminates the dependency upon chance-favorable starting conditions of the circuit, in particular on a chance-favorable circuit moment, which leads to significantly shorter compensating processes. This shortening of the compensating processes is, however, of greatest importance to a flawless cooperation of the capacitative potential transformer with the network protection relay. This method is, however, fairly complicated and necessitates use of relatively expensive and large auxiliary circuit elements, particularly the condenser connected in series with the spark gap.

The object of the present invention is to provide an improved arrangement for a capacitative voltage transformer which exhibits the technical advantages of a circuit which includes a spark gap connected in series with a condenser, together with the economic advantages of other solutions to the problem of preventing the second-mentioned undesirable oscillating condition from occurring.

In accordance with the inventive concept, the capacitance of the voltage divider on the ground side is formed by two condenser elements connected in series, and a self-extinguishing spark gap is connected in parallel with only one of these condensers.

Figure 2:
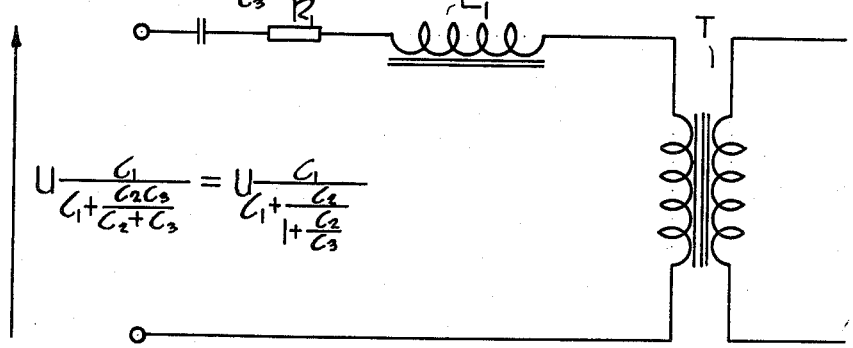

One practical embodiment of the invention is illustrated in the electrical circuit diagram of FIG. 1, and FIG. 2 is also a circuit diagram similar to FIG. 1 but showing the relationship as to capacitance between the various condenser elements which are included in the capacitative voltage divider component.

With reference now to the drawings, the line whose voltage is to be measured is indicated at N and it will be seen that a capacitative type voltage divider consisting of three condensers, C1, C2 and C3 connected in series is arranged between the line N and ground. The line voltage is indicated by the arrow with the legend U. The series connection of condensers C2 and C3 forms the ground-side capacity of the voltage divider. The primary winding Tp of the potential transformer T and possibly also a choke L1 are connected in series and these are connected across the series-connected condensers C2 and C3. Resistance R1 has been included in series with the choke L1 and transformer primary winding Tp to represent the unavoidable loss resistance belonging to these two elements which comprises copper and iron losses in the choke and copper losses in the transformer. A spark gap F is shown connected in parallel with only the condenser element C3, and the response by this gap serves to avoid tipping of the current in the middle potential circuit into the second-mentioned undesirable oscillating condition in the following manner.

In order to keep the stress on the spark gap as small as possible and thus assure it a very long useful life, or to make possible the employment of a simple and less expensive construction for it, the spark gap can have an impedance I connected before it consisting of a resistance and/or choke, which limits the current surge through the spark gap and possibly even provides for an aperiodic discharge characteristic for the condenser C3.

With reference now to FIG. 2, the capacity relation indicates that the second-mentioned oscillating condition with leading capacity current could occur only when the resultant inductivity value of the choke L1 and the transformer T is not greater than the resonance value at network frequency with the capacity $$C1 + \frac{C2C3}{C2+C3}$$

connected in advance, and when at the same time the current needed for this is smaller than the value $$\frac{U}{R1} \frac{C_1}{C1 + \frac{C2C3}{C2+C3}}$$

The high overvoltages which form in this oscillating condition however, allow the spark gap F to respond, so that the condenser C3 becomes short-circuited so that the resulting capacitance value of this condenser becomes infinite. As long as the spark gap burns, the capacity $$C1 + \frac{C2C3}{C2+C3}$$

of FIG. 2 is replaced by $C1+C2$, and the feed voltage $$U \frac{C1}{C1 \frac{C2C3}{C2+C3}}$$

is replaced by $$U \frac{C1}{C1+C2}$$

The current needed to maintain the second-mentioned oscillating condition with a leading capacity current would then have to be significantly higher while the spark gap burns, which makes this condition less probable. It is, moreover, directly possible to choose the capacity C2 to be so great that the highest current $$\frac{U}{R1} \frac{C1}{C1+C2}$$

which can flow at all in the circuit, remains smaller than that which is needed to bring the previously mentioned inductivities so strongly into saturation that they practically come into resonance with the serially connected condenser. With such a dimensioning of the condenser C2, there is then possible only the first-mentioned, desirable oscillating condition, with a lagging magnetization system, and the spark gap F is extinguished. The inductive middle potential circuit, however, already lies under a reduced voltage. The extinction of the spark gap produces a smaller potential step than the direct engagement, with which the inductivities are brought less strongly into saturation, so that the desired oscillating condition with a lagging magnetization current is achieved automatically.

Advantageously, the spark gap element F can be placed within the casing containing the condenser elements of the voltage divider, or it can be placed outside of that casing, depending upon the particular construction adopted for the capacitative potential transformer.

I claim:

1. A capacitative potential transformer comprising a capacitative voltage divider connected between the line whose voltage is to be measured and ground, and an inductive middle potential circuit connected to said voltage divider and which includes the primary winding of a transformer, the capacitance of said voltage divider on the ground side being comprised of two condensers connected in series and there being a spark gap connected in parallel with only one of said condensers.

2. A capacitative potential transformer as defined in claim 1 and which further includes an impedance connected in series with said spark gap.

3. A capacitative potential transformer as defined in claim 1 and which further includes an impedance connected in series with said spark gap, said impedance having a characteristic such as will produce an aperiodic discharge of said condenser which is paralleled by said spark gap.

4. A capacitative potential transformer as defined in claim 1 wherein said condensers are located within a casing and said spark gap is located outside of said casing.

5. A capacitative potential transformer comprising a capacitative voltage divider, said voltage divider being comprised of first, second and third condensers arranged in series in that order between a line whose potential is to be measured and ground, an inductive middle potential circuit including a transformer having the primary winding thereof connected across the series connection of said second and third condensers, and a spark gap connected in parallel with only one of the condensers to which the primary winding is connected.

6. A capacitative potential transformer as defined in claim 5 and which further includes a choke connected in series with said transformer primary winding.

7. A capacitative potential transformer as defined in claim 5 wherein U represents the line voltage, R1 the resistance loss of said inductive middle potential circuit, C1 the capacity of said first condenser and C2 the capacitance of said condenser with which no spark gap is connected in parallel, the capacitance C2 being so chosen that the highest current $$\frac{U}{R1} \frac{C1}{C1+C2}$$

which can flow at all in said inductive circuit when said spark gap burns remains smaller than that current which would be necessary to bring the inductivity thereof at least so strongly into saturation that it would come into network-frequency resonance with the resultant capacity C1+C2.

References Cited in the file of this patent
UNITED STATES PATENTS

| 2,186,486 | Higgins | Jan. 9, 1940 |
| 2,510,631 | Harder | June 6, 1950 |